(12) United States Patent
Chen

(10) Patent No.: US 7,319,693 B2
(45) Date of Patent: Jan. 15, 2008

(54) INTEGRATE NETWORK SWITCHING SYSTEM

(76) Inventor: Jun Chen, A 505 Zhichun Plaza, Zhichun Road 118, Haidian District, Beijing 100086 (CN)

( * ) Notice: Subject to any disclaimer, the term of this patent is extended or adjusted under 35 U.S.C. 154(b) by 861 days.

(21) Appl. No.: 10/469,195

(22) PCT Filed: Feb. 26, 2001

(86) PCT No.: PCT/CN01/00146

§ 371 (c)(1),
(2), (4) Date: Feb. 4, 2004

(87) PCT Pub. No.: WO02/082754

PCT Pub. Date: Oct. 17, 2002

(65) Prior Publication Data

US 2004/0109438 A1    Jun. 10, 2004

(51) Int. Cl.
*H04L 12/66* (2006.01)

(52) U.S. Cl. .................. 370/352; 370/353; 370/354

(58) Field of Classification Search ........... 370/352, 370/353, 354, 355, 356, 357, 360, 386, 387; 379/156, 164, 165, 198, 268, 269
See application file for complete search history.

(56) References Cited

U.S. PATENT DOCUMENTS 6,192,250 B1 * 2/2001 Buskens et al. ............ 455/463
6,882,711 B1 * 4/2005 Nicol ...................... 379/93.33

* cited by examiner

*Primary Examiner*—Melur Ramakrishnaiah
(74) *Attorney, Agent, or Firm*—Martine Penilla & Gencarella, LLP

(57) ABSTRACT

This invention discloses an integrated exchange system for the terminal edge network connections. The integrated exchange system, comprising an IP packet based switch system and a telephony executive engine, is capable to execute IP and non-IP communication protocols, which puts LAN, WAN, PSTN and POTS together to offer the data network functionalities of Ethernet switch, route, gateway, firewall, VPN tunnel, and voice communication functionalities of IP-PBX, voice mail box, computer telephony and call center.

23 Claims, 7 Drawing Sheets

CENTRAL EXCHANGE
SYSTEM INFRASTRUCTURE

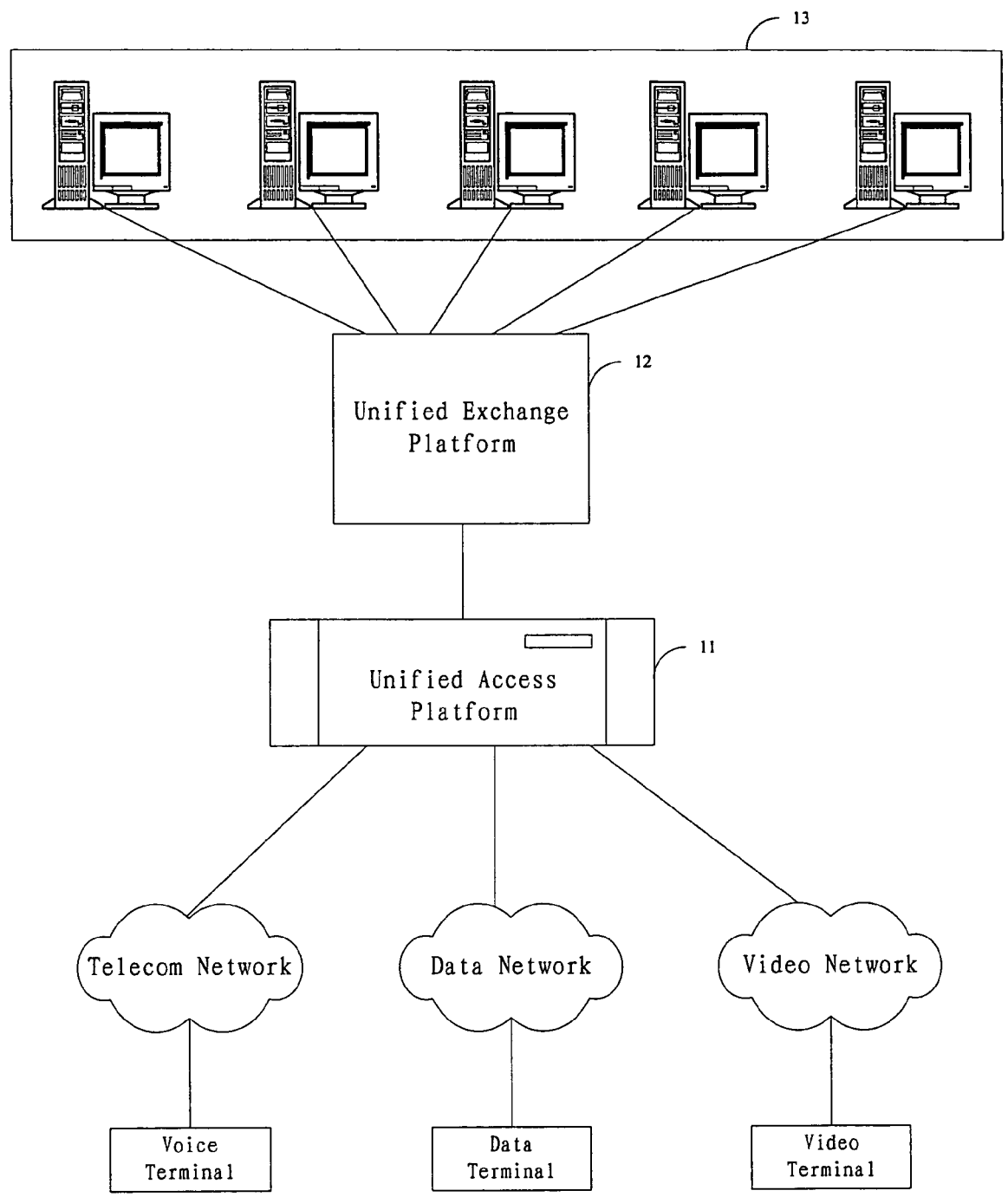
Fig #1  CENTRAL EXCHANGE
SYSTEM INFRASTRUCTURE

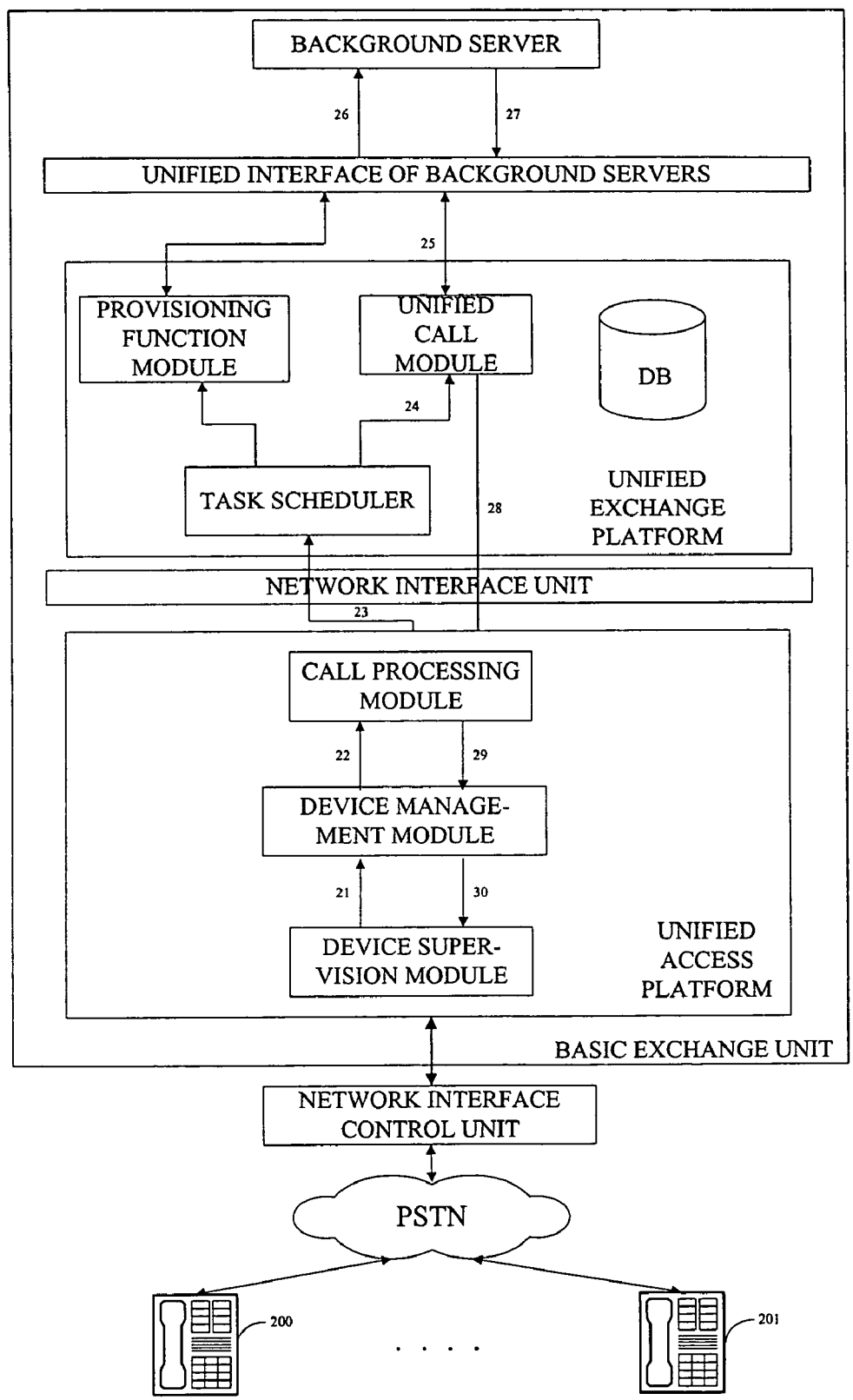
Fig #2 BASIC EXCHANGE UNIT INFRASTRUCTURE AND DATA PROCESSING

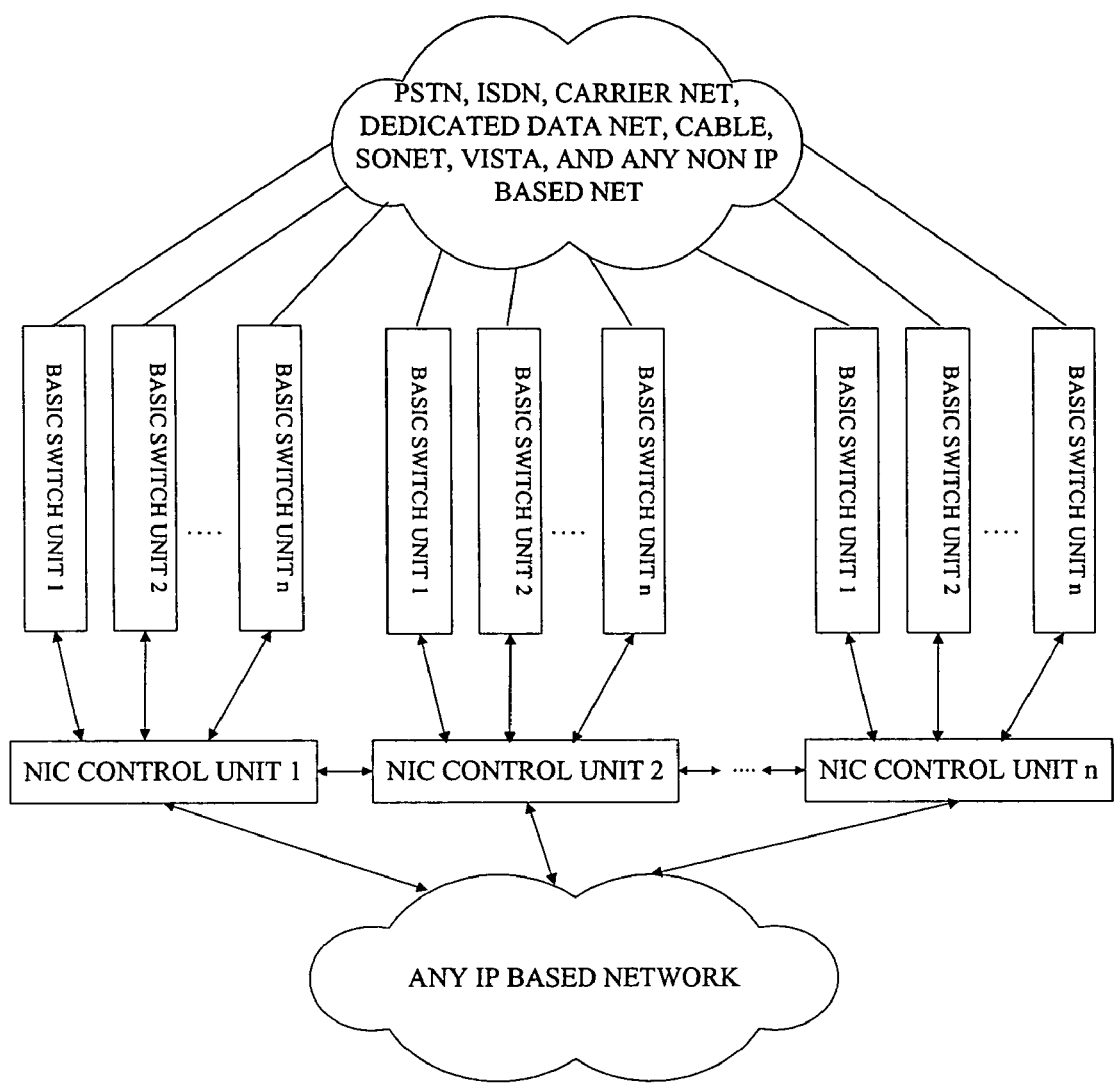
Fig #3 CONVERGED NETWORK EXCHANGE SYSTEM INFRASTRUCTURE

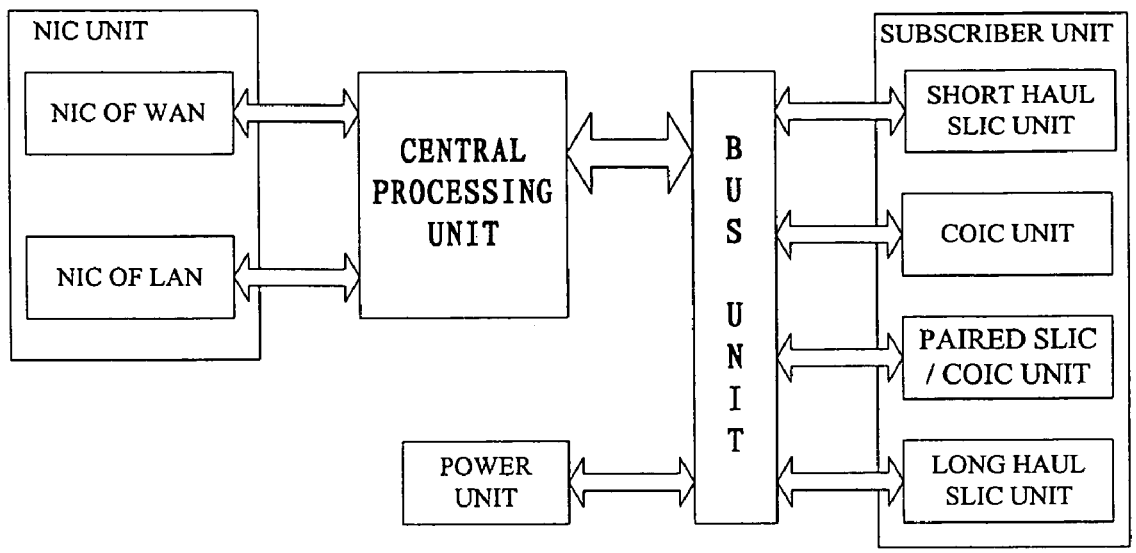
Fig #4  CONVERGED BUSINESS EXCHANGE UNIT INFRASTRUCTURE
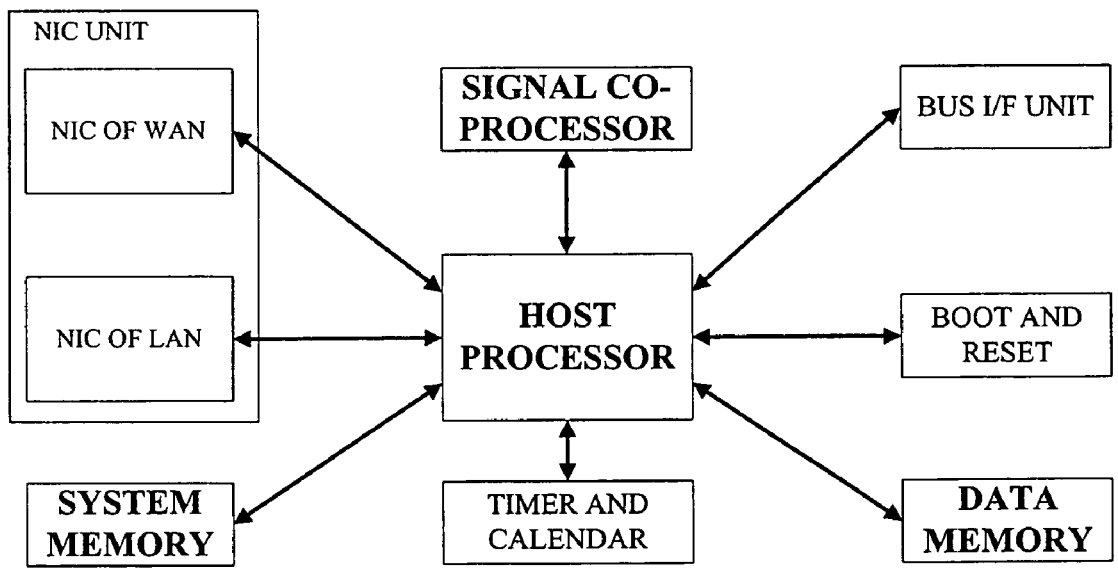
Fig #5  CENTRAL PROCESSING UNIT INFRASTRUCTURE

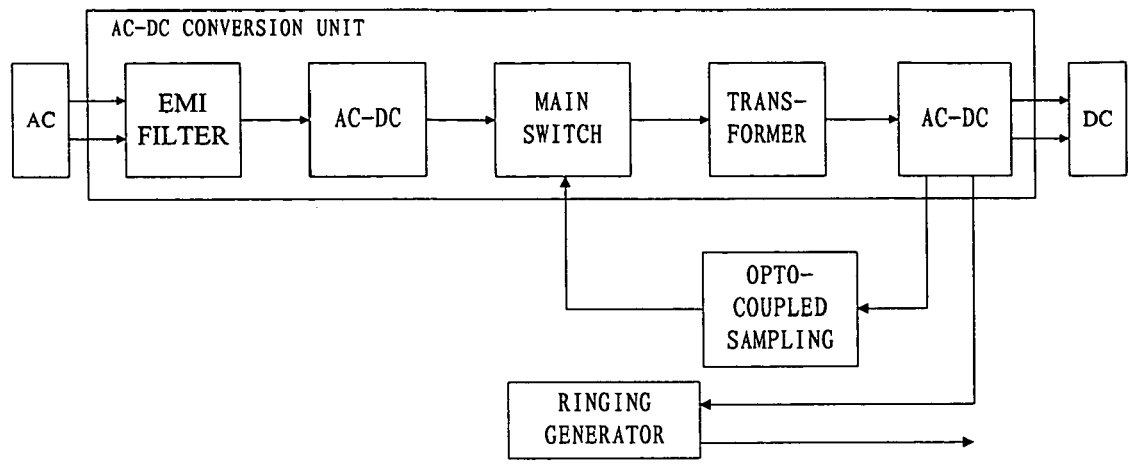
Fig #6   POWER UNIT
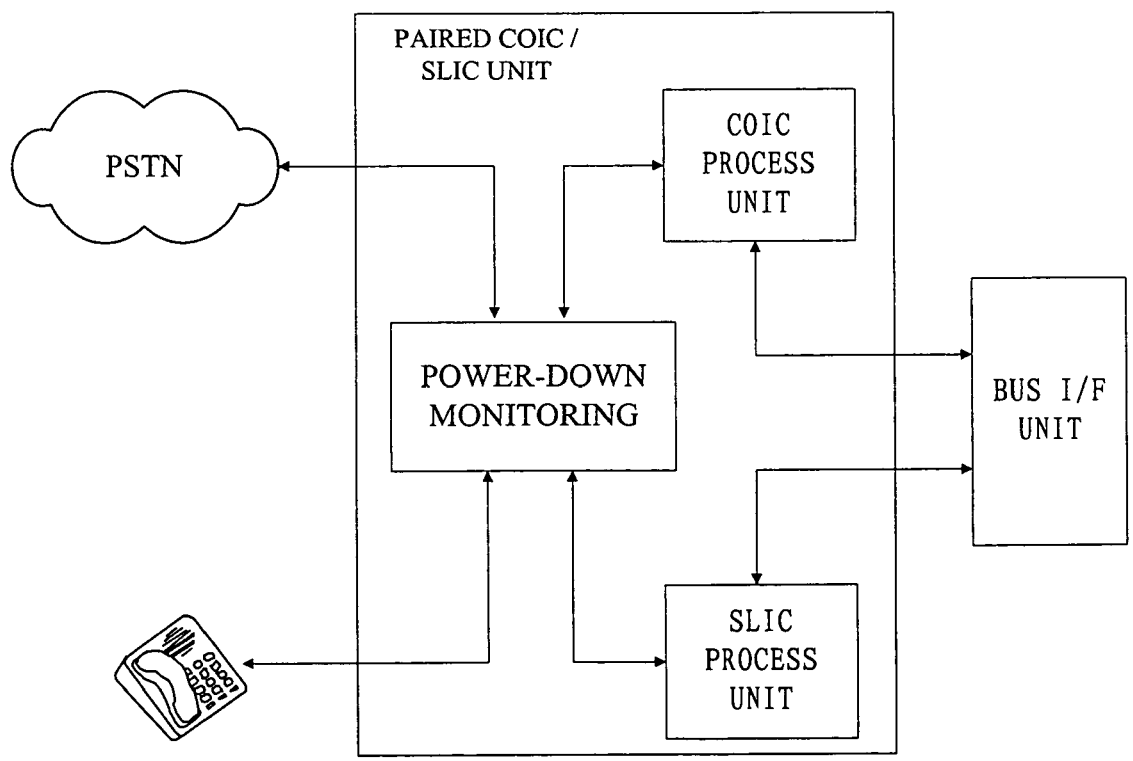
Fig #7   SUBSCRIBER INTERFACE
INFRASTRUCTURE

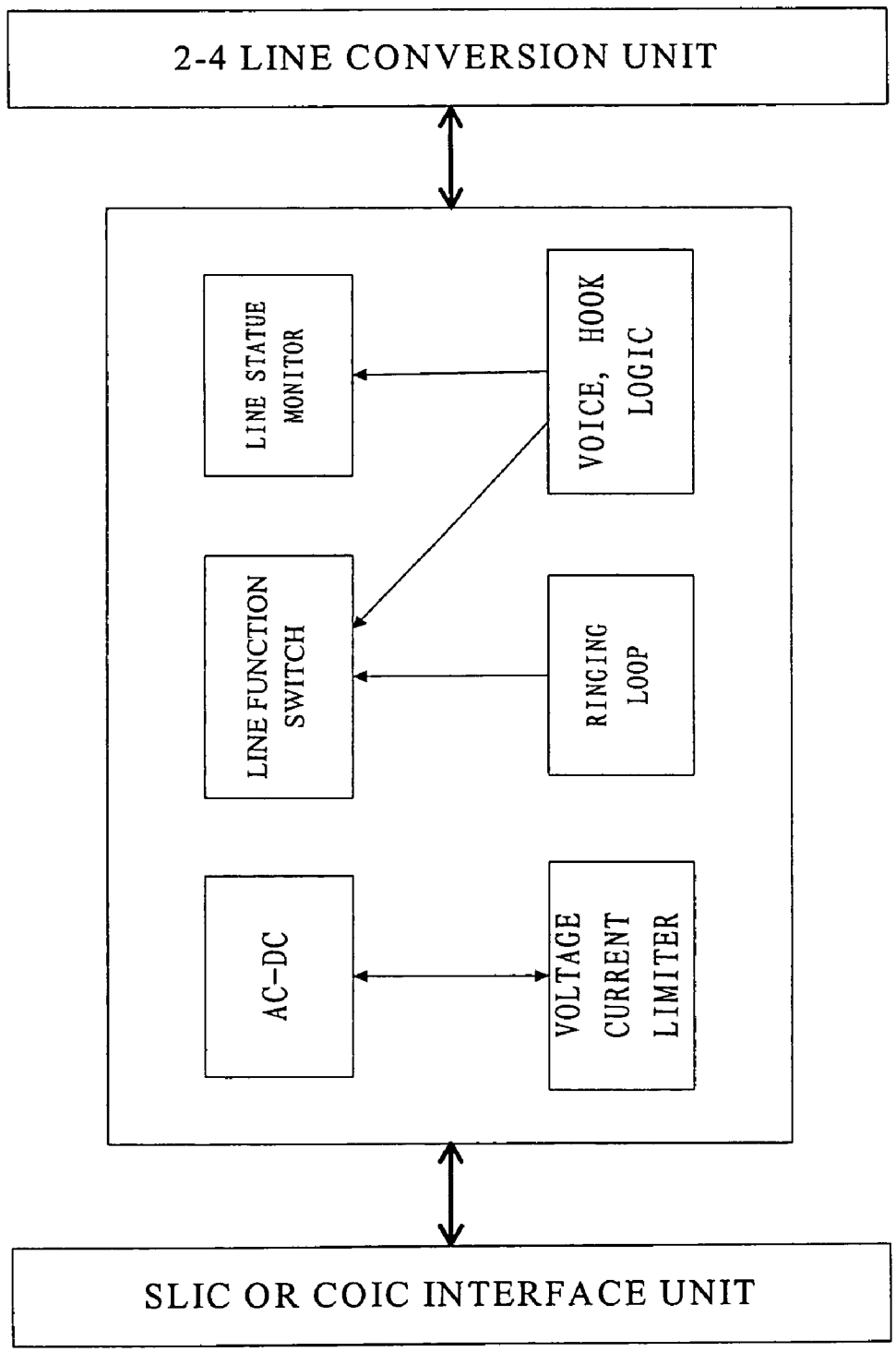
Fig #8 INTEGRATED VOICE LOOP UNIT INFRASTRUCTURE

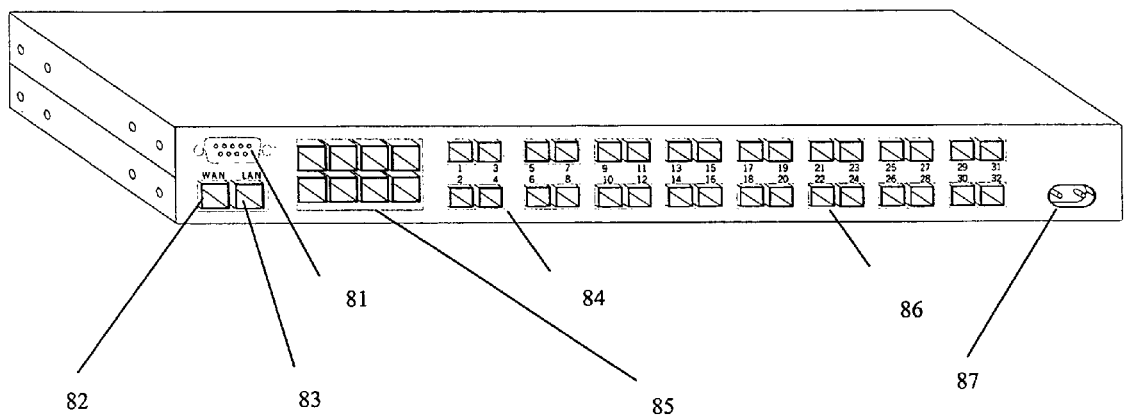
Fig #9 CONVERGED BUSINESS EXCHANGE SYSTEM IMPLEMENTATION
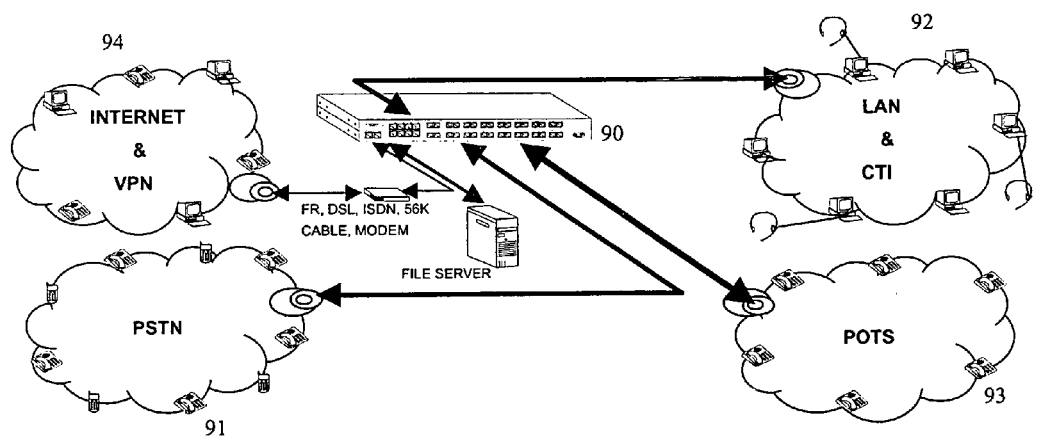
Fig 10 CONVERGED TERMINAL EDGE NETWORK EXCHANGE IMPLEMENTATION

INTEGRATE NETWORK SWITCHING SYSTEM

BACKGROUND OF THE INVENTION

Field of the Invention

The present invention relates to an IP packet based integrated data network and telecommunication system that provides terminal edge networking with converged services including LAN and WAN connection and security, local and long distance voice switching, as well as a platform to deliver value added services such as managed services, hosting, storage, unified messaging, and e-Business contents.

Traditionally home users, small offices, and mid-sized enterprises would contract different carriers for various data networks services and telecommunications services. Among these services, communication equipments of IP based and non-IP based should be set up and linked in complicated ways to meet carriers requirements. Such an environment is expensive in build-up, complex in use, cumbersome for understanding and less capable to deliver and manage add-value services. A need arises for a solution that provides an integrated data(IP) networks and telephony(non-IP) communications system that reduces the number of networking facilities, such as GATEWAY or GATEKEEPER, ROUTER, FIREWALL, VOICE MAIL BOX, PBX, that are required to work together at the customer location, reduces interactions to manage ongoing operations, simplifies the dealing with associated administrative overhead.

SUMMARY OF THE INVENTION

The main purpose of the invention offers an integrated business exchange system to the network terminal edge users for the their data and voice communications over IP networks and non-IP networks. The system is constructed in low cost and easy maintenance.

Another purpose of the invention is to offer a networking system with simple, flexible, dynamic and easy add-value service delivery.

To achieve these goals, a unique way is implemented.

An integrated network system consists of central exchange system, an inter-network to execute non-IP protocols, and at least one terminal for converged business data processing. The central exchange system is made of at least one computer and one network which links the main control unit to form a local area network. Each computer has a basic exchange unit to capture, analyze, and format data. The basic exchange unit outputs to a IP network. The Non-IP protocol process unit links to the terminals and one network control unit links at least to the basic exchange unit.

The mentioned network link unit consists of network switch and controller. The mentioned non-IP protocol network includes public service telephone network(PSTN), dedicated data networks and satellite networks.

The mentioned network terminals include at least central control unit, network interface unit, subscriber unit and bus unit, which are the industrial parallel buses or serial buses.

The mentioned main control unit include at least the CPU, data processor, calendar, storage unit, network interface, and bus unit. All these units are associative directly to CPU.

The mentioned network interface unit includes at least the local area network(LAN) and the wide area network(WAN) interfaces. The mentioned subscriber unit includes at least the analog subscriber loop interface unit, the subscriber loop paired interface unit, and the plain old telephone loop IC(POTSIC) unit.

The mentioned POTSIC includes line function switch circuitry of semiconductor transistors or relays, AC-DC convert, voltage current limiters, line status monitoring circuitry and digital control logics of TTL or VLSI.

The mentioned analog subscriber loop interface unit includes ring generator, hook circuitry, voice transceiver circuitry. The subscriber loop paired unit includes a power down monitor, for which the inter desk phone can be switched back to outgoing telephone line while power is off.

The mentioned basic exchange unit includes at least the unified access platform (UAP), unified exchange platform (UXP) and one background server. The UAP links to the UXP and to the background server via the network interface unit.

The mentioned UAP consists of the call manager unit, device supervision and scanning unit. With the supervision unit, subscriber data are captured and converted to the IP packets, and issued requests to call manager unit for connection. The call manager unit links to the task scheduler of the UXP via network interface unit.

The mentioned UXP consists of at least task scheduler for exchange maintenance, the database for data processing, the unified calling unit for processing the data, voice or video services calls. All of these units are associates to the background server.

The mentioned background server includes numbering server for number quest, the billing server, the verification server for validating subscribers, and the performance monitor server.

The mentioned unified exchange system enables the telecommunication of the traditional PSTN over the LAN, WAN even with the VPN tunnel capability. The telephony protocols can be the IPv4, IPv6, ATM or H.323.

In the summary, the integrated exchange system of the invention is mainly consisted of central exchange system, non-IP executing network, and integrate network terminals. The central exchange system is worked on IP packet soft-switching technology plus dedicated proprietary routing protocol for information exchange between IP networks and non-IP networks.

This invention presents an unique communication exchange system, which tremendously takes the advantage of the IP packet soft switching methodology to make the data networking and telecommunication over LAN, WAN, PSTN and VPN seamlessly.

BRIEF DESCRIPTION OF THE DRAWINGS

FIG. 1 is a schematic diagram of a central exchange system infrastructure in accordance with the present invention. It shows how is the exchange built-up.

FIG. 2 is a schematic diagram of a basic exchange unit infrastructure and data processing in accordance with the present invention. It shows the fundamental processes taking place in the real world exchange system.

FIG. 3 is a schematic diagram of a converged network exchange system infrastructure in accordance with the present invention. It shows the connections between IP networks and non-IP networks.

FIG. 4 is a schematic diagram of a converged business exchange unit infrastructure in accordance with the present invention. It illustrates the overall building block of the exchanger.

FIG. 5 is a schematic diagram of a central processing unit infrastructure in accordance with the present invention. It illustrates how the real component blocks is built on the main system board.

FIG. 6 is a schematic diagram of a power unit in accordance with the present invention.

FIG. 7 is a schematic diagram of a subscriber interface infrastructure in accordance with the present invention.

FIG. 8 is a schematic diagram of an integrated voice loop unit infrastructure in accordance with the present invention.

FIG. 9 is a converged business exchange system implementation in accordance with the present invention. It shows the real connection of data networks, telecommunication and IP telephony to an all-in-one box.

FIG. 10 is a schematic diagram of a converged terminal edge network exchange implementation in accordance with the present invention. It illustrates an actual terminal edge converged business exchange that puts the various communication terminals connection together.

DETAILED DESCRIPTION OF THE PREFERRED EMBODIMENTS

An embodiment of an integrated data networks and telecommunications system, in accordance with the present invention, is shown in FIG. #1. The embodiment includes three major highly integrated layers: a unified access platform 11, a unified exchange platform 12 and background servers 13. The background servers include various servers to perform different functions, such as a numbering server, bill rating server, verification server, bill clearance server, and performance monitor server. Among them, the numbering server is for call number processing, a bill rating server for the billing analysis in different service locations and time spans, a verification server for validating subscriber, a billing server for bill clearance and a performance monitoring server for supervision the exchange system running status.

Subscribers from various kind of network access the central exchange system through a unified access platform 11. By the process of the unified exchange platform 12 and the unified access platform, data information from various kind of networks are converted into IP packets for easy transportation to the any kind of IP based networks. The background server layer 13 is served as supervision of servers with different functionalities.

As shown in FIG. #2, the central exchange system includes a unified exchange platform, a unified access platform, the background servers and the interface to the network unit and background server unit. The unified access platform consists of task scheduler, function supervision unit, unified call unit database and background server interface; the unified exchange platform consists of call manager unit, device supervision unit, and the device scanner unit.

The task scheduler unit serves as task assignment in the unified exchange platform. The function supervision unit serves as the fulfillment of unified exchange platform maintenance function, including port testing, port quest, etc. The unified call manager unit serves as the call process and control for all the incoming and outgoing calls and related tasks. Any services of data, voice, image and video are treated with a unified call manager to process in order to fulfill the unified exchange for all kind of services under the unified exchange platform. The database caters for data support during all processing.

The device scanner unit serves as receiving and converting subscriber data to IP packets. The device supervision unit charges for data analysis and call environment set up. In addition to device control, the issues connection requests to call manager unit, which handles all the call related functionalities.

The unified exchange platform connects to the unified access platform through the network interface unit. The network unit charges for the real time communication bandwidth of the unified access platform. Within the unified exchange platform all the communication units bundle in the network interface. While a communication unit needs to work, a message port, a kind of data structure, are assigned to it. While the unit requires sleep, the port is hung up to save system resources. The background server interface unit serves for the communication between the unified exchange platform and the background servers.

As shown in FIG. #3, the central exchange system includes a basic exchange unit, a network connection control unit. The basic exchange unit can be ported in from kinds of networks, such as public service telephone network, ISDN, carrier data network, cable TV network and satellite network. All of the outputs of network control units can be routed to any IP based network for communication.

The exchange infrastructure, shown in FIG. #4, is for network terminal, which consists of main control unit(the system main board), bus unit(the back plan), and various kind of subscriber interface unit, network interface unit and power supply unit. The network interface unit includes local area network and wide area network. The subscriber unit includes an analog subscriber loop interface unit, central office interface unit, paired subscriber loop interface unit. All of the network interfaces associate directly with the main control unit, while the subscriber interface unit and power supply unit connect to the main control unit through bus unit.

The main control unit of the converged exchange is shown in FIG. #5. It is served for centralizing the control to all the system for task assignment, control and monitoring. This unit consists of the host processor, data co-processor, system and data storages, bus unit, local area network connection and wide area network connection unit, calendar unit and clock unit. The inter connection of the units is via peripheral bus interface(PCI), industrial standard architecture bus (ISA).

In the bus unit a remote boot up system monitor routing is built-in in order to start the system from remote network.

The subscriber interface unit has several different interface designs for easy adaptation to public service telephone network(PSTN).

1. Analog subscriber loop interface unit: This unit is designed for low cast, easy adaptation to different countries protocols and simplifying manufacture. In the FIG. #8, the unit includes mainly a voice or hook control logic circuitry, voltage current limiter, ringing loop drive, two line to four line conversion, and line status monitor circuitry.

2. Central office subscriber loop interface unit: This unit is for PSTN interface. It is designed using a self-owned integrated voice loop circuitry to implement the functionalities of the AC-DC conversion, ringing signal pick-up, automatic hooking, voltage and current limit, two line to four line conversion, and line status monitor.

3. Paired subscriber loop interface unit: This unit is the combination of the analog subscriber loop interface(SLIC) with the central office subscriber loop interface(COIC) as shown in FIG. #7. The two interface of the unit is associated through a power monitoring unit, by which the inter desk phone, or the SLIC port, can be switched back to outgoing telephone line, or COIC port, while power supply is off. This function increases the availability of the telephone services for all the exchange system, and indirectly meets the market acceptance to a greater extent.

The network connection unit comprises the network connection and the network controller to implement the basic exchange functionalities between network terminals and the other Ethernet network devices, and to monitor and control whole network system.

The power supply unit, shown in FIG. #6, comprises an advanced switching power supply design for high quality and multiple outputs, including the telephone ringing power source. The ring source is specially designed for space precious application. The power outputs are DC 5 Volts, DC 3.3 Volts, DC −48 Volts and AC 96 Vpp in 20 Hertz, while the ring source is capable to drive thirty-two ringing channels simultaneously.

One of the embodiments of the network terminal edge exchange is illustrated in FIG. #9, in accordance with the present invention. The exchange system is built with a 10/100 mega bit Internet WAN interface 82, a cooperate server interface 83, up to thirty two public service telephone network(PSTN) 84, and plain old telephone service network interfaces(POTS SLIC) 86, up to eight 10/100 mega bit Ethernet channels for local area network interface 85 in addition to the interface for network management 81. The network security route and the firewall gateway are also implemented.

With the embodiment of the network terminal edge exchange, the converged business exchange system for the network terminal is implemented in FIG. #10. Such a converged exchange system not only realizes the functionalities of the Internet access, the local area networking (LAN), the PSTN access, the virtual private networking, the computer based telephony integration, and the telephone private branch exchange(PBX), but also makes the legacy voice telephony over all of these networks on which the IP based and/or non-IP based. The interaction of the telephone, the data and the image can be realized in a unified way. Through the converged exchange terminal 90, local telephone 91, cooperate inter telephone 93, cooperate computer telephony, remote Internet call 94 can be associated to each other, in addition to making a conference call. The call made between two exchange terminals 90, such as the computer phone 92 to the cooperate phone 93, can even be made over virtual private network(VPN), making the communication easily manageable and more secure than ever before.

Things are the same for data communications as that happened with the voice telephony. Through the unified converged network exchange terminals 90 access, the cooperate local area network and the cooperate VPN integrate with the Internet seamlessly, which brings great convenience for the communications between cooperates and the home working staffs or mobile users, the headquarters and their satellite offices.

The interactive communications also get great convenience only because the voice, data and visual media information are communicating in the way of unified packet and operable over LAN, WAN, PSTN, and VPN.

Checking in the FIG. #2 shows the accordance with the present invention in how the unified calling takes place in a real world.

Say a calling device 200 connects to the basic exchange unit through the access network. When calling device 200 issues call request, this call is passed to the basic exchange unit, in which a device scanner unit processes the calling and its related information, converts the calling to be packet capable communication over IP networks, then submits the call to device manager for unified access and handling.

Following the step 21, the device manager unit is in charge of analyzing the submitted call, get ready to setup running environment for the call, takes control to the access operation, and issues call connection request to the calling process unit;

Following the step 22, once the calling process unit gets the calling request, calling process and state control takes place, and interacts with the unified exchange platform through network interface unit;

Following the step 23, the task scheduler unit makes analysis to the communication request from the unified access platform, and creates a unified calling unit to process further;

Following the step 24, the unified call unit makes unified calling process for all the incoming calls and all the outgoing calls, fulfills related call conversation functions;

Following the step 25, the unified call unit reports its housekeeping works to the business function server through the unified background server interface, and fulfills other system supporting tasks further;

Following the step 26 and 27, this process continues to notify the access platform of the callee to process the current calling;

Following the step 28, once the access platform of the callee receives the message of making connection, the callee process environment sets up and the relative function is in processing.

Following the step 29, through the device scanner unit the callee process is converted to the control instructions identifiable by the access device;

Following the step 30, then these instructions are delivered to the access device 201 finally.

Although the preferred embodiments of the present invention have disclosed for illustrative purposes, those skilled in the art will appreciate that various modifications, additions and substitutions are possible, without departing from the scope and spirit of the invention as disclosed in the accompanying claims. Accordingly, it is to be understood that the invention is not to be limited by the specific illustrated embodiments, but only by the scope of the appended claims.

GLOSSARY

1) Terminal Edge Network

As opposed to the core edge network, the terminal edge network is the "last mile" place that a user accesses to the overall global networks, no matter the network is IP based or not.

2) Converged Terminal Edge Network Business Exchange(CBX)

Enable users within the terminal edge network for accessing data and voice transparently over LAN, WAN, PSTN and VPN with as affordable security and minimal administration as possible.

3) Packet Based Integrated Telephony

Voice activities of talking, transportation, switching and storing over a network that is based on packet technology such as IP (Internet Protocol) as opposed to circuit switching such as the traditional Public Switched Telephone Network (PSTN).

What is claimed is:

1. An integrated system of data network and telecommunication that comprises:
   an inter-network to execute non-IP protocols, and at least one terminal for converged business data processing;
   the central exchange system is made of at least one computer and one network linking the main control unit to form a local area network;
   each computer has a basic exchange unit to capture, analyses, and format data;
   the basic exchange unit outputs to an IP network;

the non-IP protocol process unit links to the terminals and one network control unit links at least to the basic exchange unit.

2. The system of claim 1, wherein the converged business exchange system features that the mentioned network connection unit includes network switch and network controller to make the control, link and monitor to basic exchange units.

3. The system of claim 1, wherein the converged business exchange system features that the mentioned network to execute non-IP protocols is Public Service Telephone Network(PSTN) or the Cable Television Network(CTN).

4. The system of claim 1, wherein the converged business exchange system features that the mentioned the network of converged businesses is the metropolis area network(MAN), or the local area network(LAN), or the virtual private network(VPN), or the optical network(SONET), or the satellite data network(VAST).

5. The system of claim 1, wherein the converged business exchange system features that the mentioned the converged exchange terminal comprises at least:
a main control unit, a network interface unit, a subscriber unit, power supply unit and a bus unit;
the network interface unit associates directly to the main control unit, to which the subscriber unit and the power supply unit are connected via the bus unit.

6. The system of claim 5, wherein the converged business exchange system features that the mentioned main control unit comprises at least:
a central or host processor, a data co-processor, calendar unit, system and data storage, network interface unit, clock and bus unit.

7. The system of claim 5, wherein the converged business exchange system features that the mentioned network unit includes at least:
a local area network interface and a wide area network interface.

8. The system of claim 5, wherein the converged business exchange system features that the mentioned subscriber interface unit includes at least:
an analog subscriber loop interface unit, a carrier or service provider interface unit, a paired analog subscriber loop interface unit.

9. The system of claim 6, wherein the converged business exchange system features that the mentioned the network connection unit includes at least a local area network interface unit and a wide area network interface unit.

10. The system of claim 5, wherein the converged business exchange system features that the mentioned power supply unit includes at least an AC-DC conversion unit, an optical isolated sampling and unit, and a ring source generator unit.

11. The system of claim 10, wherein the converged business exchange system features that the mentioned the ring source generator is built in the main power supply board, and capable to ring the telephones up to thirty two channels.

12. The system of claim 10, wherein the converged business exchange system features that the mentioned the optical isolated sampling is for the multiple power output simultaneously.

13. The system of claim 10, wherein the converged business exchange system features that the mentioned the power output rates DC 5.0V or DC 3.3V, or DC−48V or AC−96 Vpp/20 Hz.

14. The system of claim 6, wherein the converged business exchange system features that said data storage is directly set in a mainboard of the system.

15. The system of claim 5, wherein the converged business exchange system features that the mentioned bus unit includes at least a standard industrial interface, a peripheral interface, a general purpose serial bus, a smart disk, or a small computer system interface.

16. The system of claim 8, wherein the converged business exchange system features that the mentioned analog subscriber loop interface unit comprises a ringing drive circuitry, an integrated voice interface circuitry (POTSIC), ring loop, and voice coding and decoding circuitry.

17. The system of claim 16, wherein the converged business exchange system features that the mentioned integrated voice interface circuitry (POTSIC) consists of a line function switch circuitry, voltage current limiter, voice and hook control logics, and line status monitoring circuitry.

18. The system of claim 8, wherein the converged business exchange system features that the mentioned analog paired subscriber loop unit mixes an analog subscriber loop interface with a telephone carrier interface.

19. The system of claim 8, wherein the converged business exchange system features that the mentioned analog paired subscriber loop unit includes a power down monitoring unit, for which the inter desk phone can be switched back to outgoing telephone line while power is off.

20. The system of claim 1, wherein the converged business exchange system features that the mentioned basic exchange unit comprises at least a unified access platform, a unifies exchange platform, and one or more background servers;
with the network interface the unified exchange platform connects to the unified access platform and the background servers.

21. The system of claim 20, wherein the converged business exchange system features that the mentioned unified access platform comprises a call manager unit, a device supervision unit, and a device scanner unit this device scanner unit converts data from subscribers into IP packets, and passes them to device supervision unit for analyzing, building up call environment and issuing the call related requests to call manager unit;
with the network interface the call manager unit associates with the task scheduler unit of the unified exchange unit.

22. The system of claim 20, wherein the converged business exchange system features that the mentioned unifies exchange platform comprises at least a task scheduler unit for task assignment, a supervision unit for switch layer maintenance, a database, and a unified call unit for data services and voice or video services call manager;
with the background server interface the task scheduler unit associates with the supervision unit and the unified call unit.

23. The system of claim 20, wherein the converged business exchange system features that the mentioned background server includes at least a numbering server for call number processing, a bill rating server for the billing analysis in different service locations and time spans, a verification server for validating subscriber, a billing server for bill clearance and a performance monitoring server for supervision the exchange system running status;
all of theses server are associated with the unified exchange platform through a unified exchange server interface.

* * * * *